United States Patent [19]
Williams et al.

[11] Patent Number: 5,410,108
[45] Date of Patent: Apr. 25, 1995

[54] COMBINED SCANNER AND SCALE

[75] Inventors: Kevin J. Williams; Alexander M. McQueen; James E. Colley; Anthony S. Bailey; Phillip C. Gummeson, all of Eugene, Oreg.

[73] Assignee: Spectra-Physics Scanning Systems, Inc., Eugene, Oreg.

[21] Appl. No.: 938,096

[22] Filed: Aug. 31, 1992

[51] Int. Cl.⁶ .................... G01G 19/40; G01G 19/52; G01G 21/00; A63F 9/02
[52] U.S. Cl. .................. 177/25.15; 177/50; 177/126; 177/145; 186/61
[58] Field of Search .................. 177/50, 25.15, 145, 177/126; 186/61

[56] References Cited
U.S. PATENT DOCUMENTS

| | | |
|---|---|---|
| 4,064,954 | 12/1977 | Rock . |
| 4,425,975 | 1/1984 | Luchinger . |
| 4,656,344 | 4/1987 | Mergenthaler ............... 235/462 |
| 4,669,663 | 6/1987 | Meyer . |
| 4,881,606 | 11/1989 | Halfon ........................ 177/126 |
| 4,909,338 | 3/1990 | Vitunic et al. ............... 177/50 |
| 4,971,176 | 11/1990 | Nojiri ........................ 177/245 |
| 4,971,177 | 11/1990 | Nojiri ........................ 177/245 |
| 4,991,692 | 2/1991 | Nojiri ........................ 186/61 |
| 5,005,670 | 4/1991 | Nojiri . |
| 5,073,702 | 12/1991 | Schuhmacher . |
| 5,086,879 | 2/1992 | Latimer .................... 186/61 |
| 5,139,100 | 8/1992 | Brauneis .................. 177/25.15 |
| 5,143,164 | 9/1992 | Nahar . |

OTHER PUBLICATIONS

Posdata brochure entitled *Weigh The Advantage*, dated 1991.
Posdata brochure regarding the Posiscale 3030, dated 1990.
Symbol Technologies brochure regarding the Laser Scan 5000, dated 1991.
ICL Datachecker brochure regarding the Orion Scanner/Scale, undated.
Pp. A1-A3 from the Orion Scanner and Scale Installation and Maintenance Manual, dated 1989.
ICL Datachecker brochure regarding the Orion Scanner/Scale entitled *A Total Scanning Solution*, no date discernible.
Spectra-Physics brochure regarding the Scanning-Scale Model 760SLS, dated 1989.
NCI brochure regarding the NCI Model 4710 Scanner Scale, undated.

Primary Examiner—George H. Miller, Jr.
Attorney, Agent, or Firm—Lyon & Lyon

[57] ABSTRACT

A data gathering system including a scanner and scale including one or more of the following features: a construction of compact dimensions with a low profile; integrated construction of the locations of the scanner and scale, and their associated components; modular components that are easily detachable and serviced; a rigid casing which is integrated into the overall data gathering system and which prevents a countertop from contacting the scale; and diagnostic capability incorporated into the data gathering system.

31 Claims, 9 Drawing Sheets

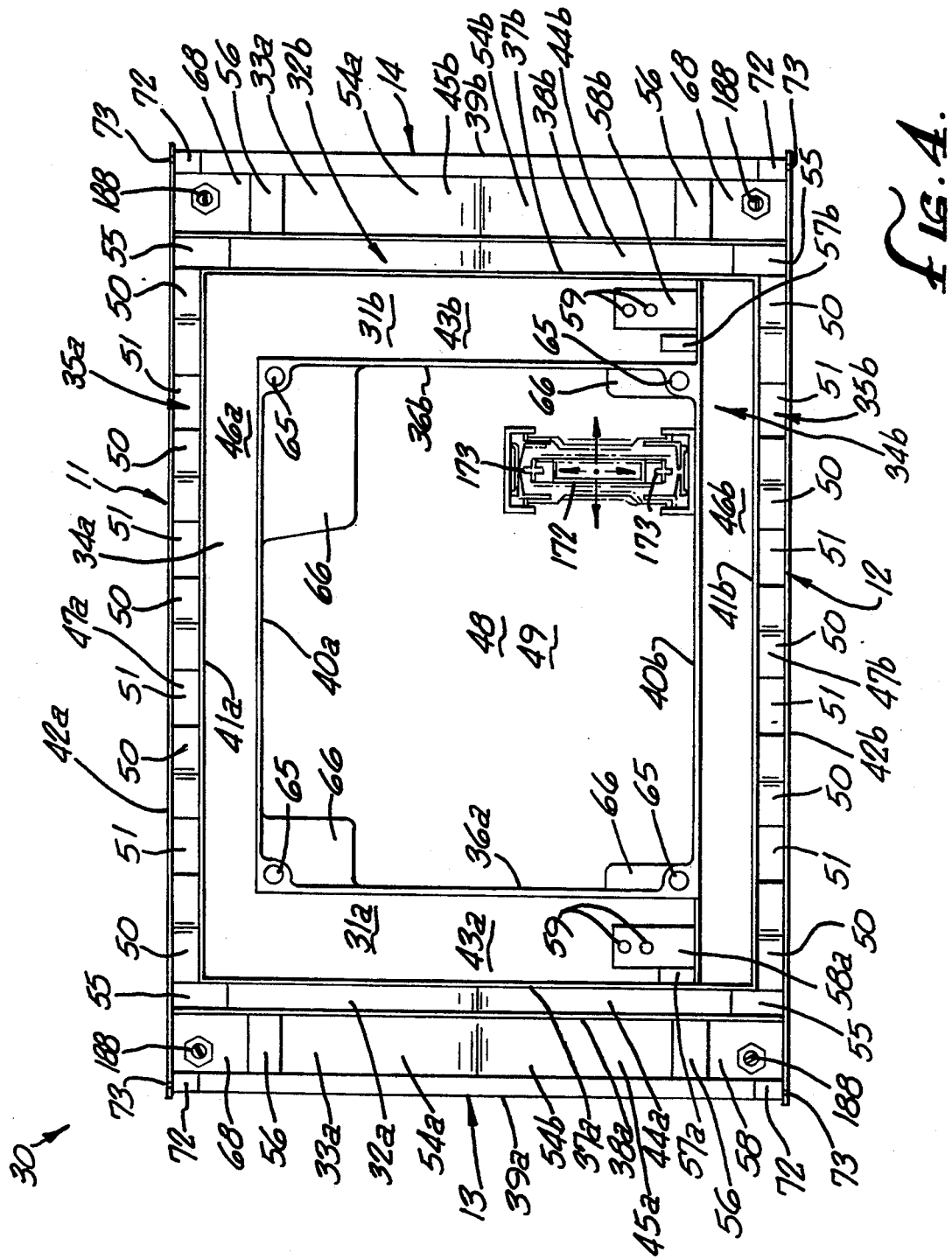

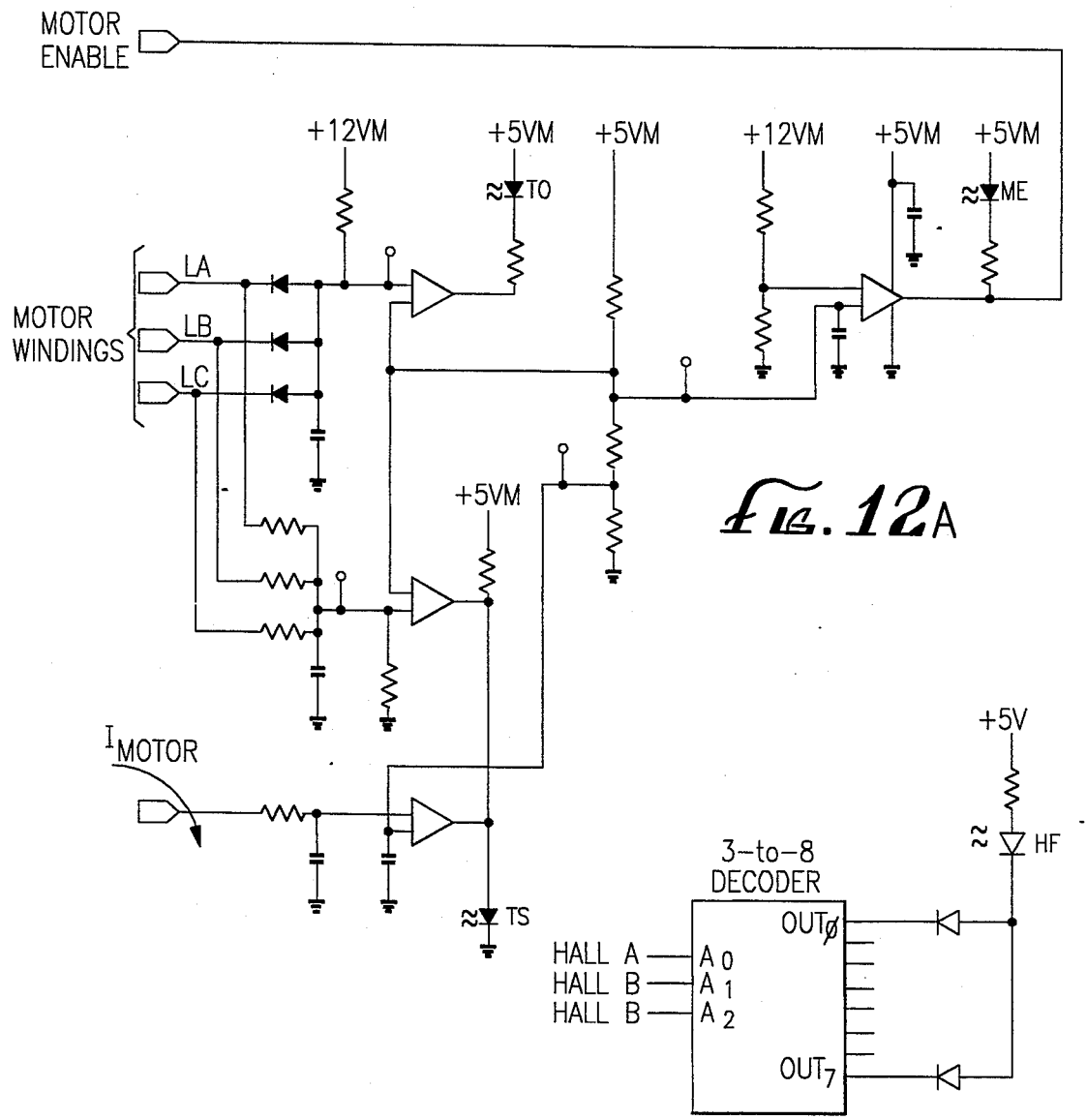
*fig.*12A
*fig.*12B
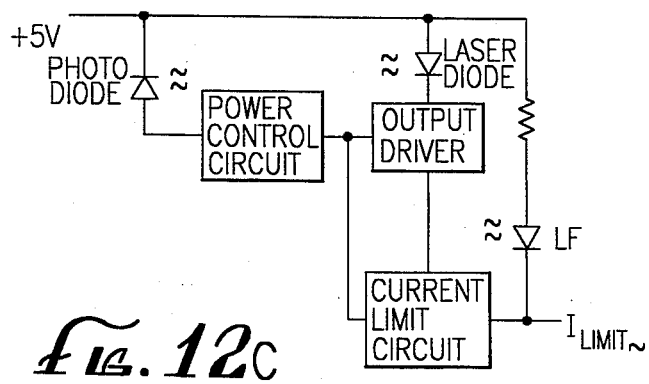
*fig.*12C

COMBINED SCANNER AND SCALE

BACKGROUND OF THE INVENTION

The field of the invention relates generally to data gathering systems which may include a scanner for scanning an item and a scale for weighing items.

Data gathering systems which may be installed in checkout counters in supermarkets and other retail locations commonly include a scanner to scan items of food or other products. The scanner typically scans or reads bar codes, industrial symbols, alphanumeric characters or other indicia for object recognition. Typically, bar code labels or other indicia are read as items are passed over a scanning window in the top surface of the scanner. The bar code or other indicia is then converted into product identification and pricing information which may be used for inventory control and to calculate a customer's bill. Certain existing data gathering systems also include a scale which allows the checkout clerk to weigh items which are sold according to weight such as produce. The weight may then be fed directly to the point of sale terminal for purposes of calculating a price.

The scanner component typically includes a light source such as a laser, a rotating mirror driven by a motor, and a mirror array. The laser beam is reflected off the rotating mirror and mirror array to produce a pattern of scanning light beams. As a bar code or other indicia on the item is passed over the aperture or window, the scanning light beams scatter off the bar code or other indicia, and a carrier signal returns to the data gathering system where it is collected and detected. The scale component of such data gathering systems typically comprises a top plate on which the item to be weighed is placed. The top plate may also include an aperture or window whose location corresponds to the window of the scanner and through which the scanning light beams pass.

Certain data gathering systems which include both a scanner and scale arrange these components so that the scanner assembly is mounted on and above the scale assembly. One problem with this configuration is that when an item is weighed, the actual weight detected includes the weight of the scanner assembly. Thus, the weight of the scanner must be "zeroed out" or calibrated so that the weight reading will reflect only the weight of the item. Furthermore, the accuracy and speed of the scale may be affected by weighing the additional scanner mass. Still further, it may be difficult to actually calibrate or zero-out the system in such a configuration. Yet another problem regards the cables used to connect the scanner to the scale. The weight of the cables themselves has been seen to inconsistently contribute to the weight reading. Also, the cables have been seen to periodically rub against other components of the system thereby causing drag and a consequent inaccurate weight reading.

Mounting the scanner on top of the scale also increases the overall vertical dimension of the system which in turn requires that the counter provide a larger volume of space below the countertop for installation. The requirement of increased volume may preclude that a checkout clerk sit down with his or her legs underneath the counter. Furthermore, the counter may simply be unable to accommodate a system with a high vertical dimension regardless of whether a checkout clerk's legs are to be located underneath the counter. Still further, the system's bulk is increased making it significantly more difficult to install and remove from the counter.

In some systems, a scale component is placed alongside the scanner component. However, this side-by-side configuration greatly increases the "footprint" (i.e., length and width) of the system which in turn requires that a larger (or a second) hole be cut out of the countertop to accommodate the larger footprint of the data gathering system.

Certain existing systems require that both scanner and scale assemblies be supported by their own set of electronic components such as printed circuit boards, cables and hardware. Thus, the system effectively has two sets of components, many of which are duplicative between the two assemblies. The increase in number of components increases the chances of failure as well as adds to the system's size and cost.

Another problem synonymous with existing scanner/scale systems is that they may require substantial disassembly for maintenance procedures. For example, where the scanner is mounted on top of the scale, much or all of the scanner may have to be removed so that problems located under the scanner or in other hard to reach locations, may be diagnosed and rectified. Removal of the scanner itself may be difficult in those systems where the scanner does not exhibit a modular design to allow the scanner to be removed as a unit.

Furthermore, merely isolating the area requiring service may require extensive troubleshooting efforts. Existing systems do not include diagnostic readouts or other indicators which can identify the failed component(s) without disassembling the system. Thus, a technician may have to spend substantial time merely isolating the problem, let alone disassembling and repairing it. Even if the malfunction is contained in an easily accessible component, the design of existing data gathering systems may require that a technician remove the component from the system so that test points may be probed to locate the malfunction. Probing test points may require that an oscilloscope or other expensive test equipment be used which may be difficult if the system is to be serviced in the field.

Another problem with existing data gathering systems is that the top of the system, or platter, where items are placed for weighing purposes, may oftentimes contact the countertop. Contact may result from an improperly dimensioned hole in the countertop through which the system is installed. Such contact causes improper vertical deflection of the scale and incorrect weight measurements.

Thus there is a need for a data gathering system which overcomes the problems noted above.

SUMMARY OF THE INVENTION

The present invention is a data gathering system which, in its preferred embodiment, is a combined laser scanner and weigh scale having one or more of the following aspects:

(1) a construction of compact dimensions with a low vertical profile;

(2) integrated construction of the locations of the scanner and scale, and their associated components;

(3) modular components that are easily detachable and serviced;

(4) a rigid casing which is integrated into the overall data gathering system and which prevents a countertop from contacting the scale; and (5) diagnostic capability incorporated into the data gathering system.

BRIEF DESCRIPTION OF THE FIGURES

FIG. 4 is a top view of a base enclosure.

FIG. 10a is a cross-sectional view of FIG. 10 taken along line 10a—10a.

FIGS. 12a, 12b, 12c are schematics for diagnostic circuitry.

DESCRIPTION OF THE PREFERRED EMBODIMENT

Figure 1:
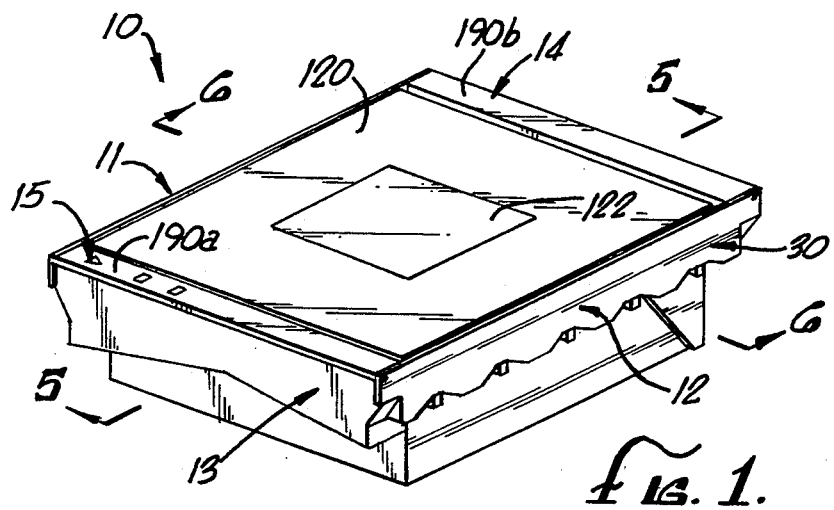
FIG. 1 is a perspective view of a data gathering system.

Referring to FIG. 1, a data gathering system 10 is shown which includes a base enclosure 30 containing a scale weigh platter 120 along with a scanner module (described below) behind a window 122 in the center of the weigh platter 120. Though the following description of a preferred application may describe the scanner module as a laser scanner for scanning a desired target, the scanner module may be any reading device detecting a desired target. The target may be any object desired to be read including bar codes, industrial symbols, alphanumeric characters, and other indicia for object recognition.

Figure 2:
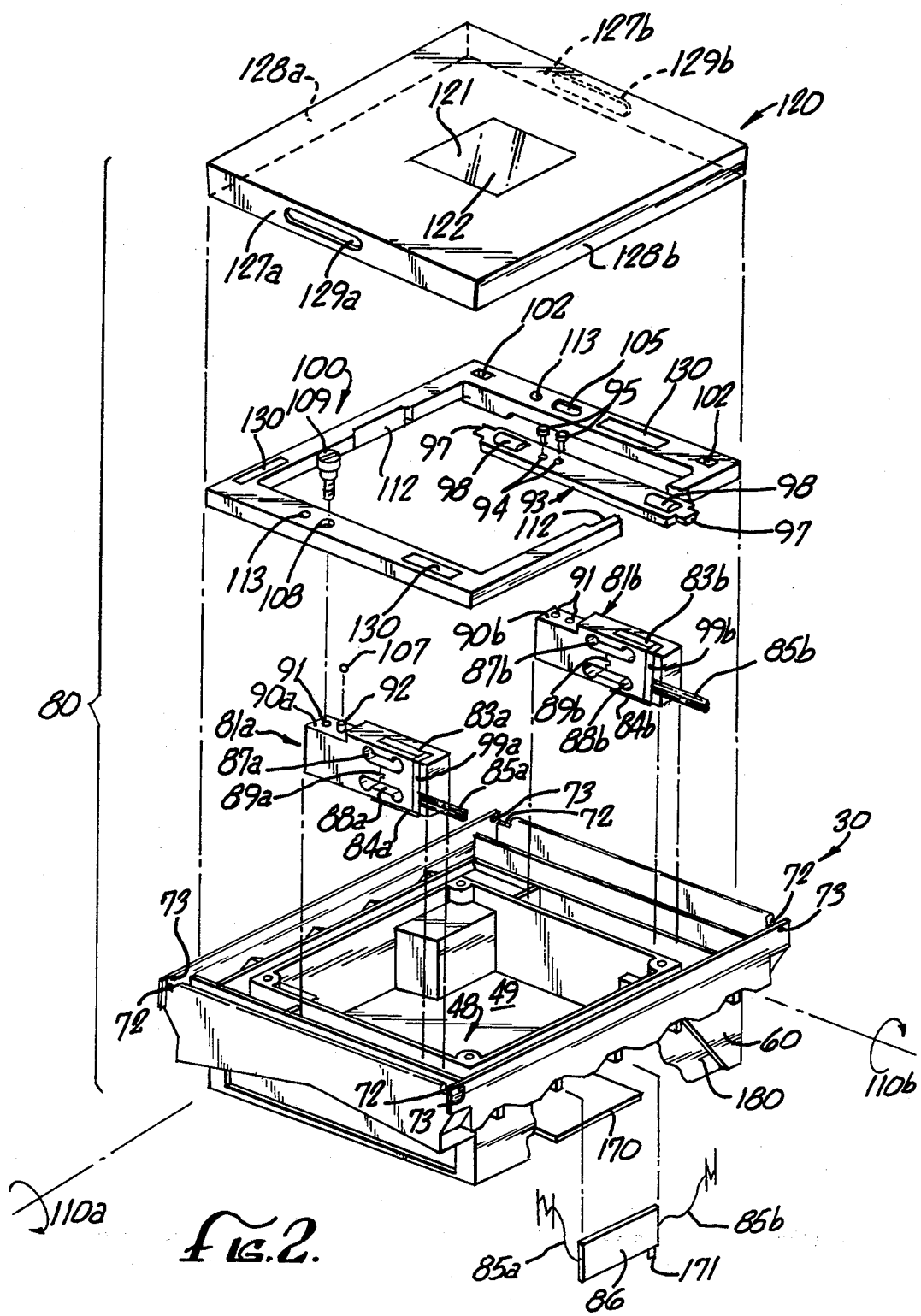
FIG. 2 is an exploded view of a scale module and base enclosure with a part of a cover removed.
Figure 3:
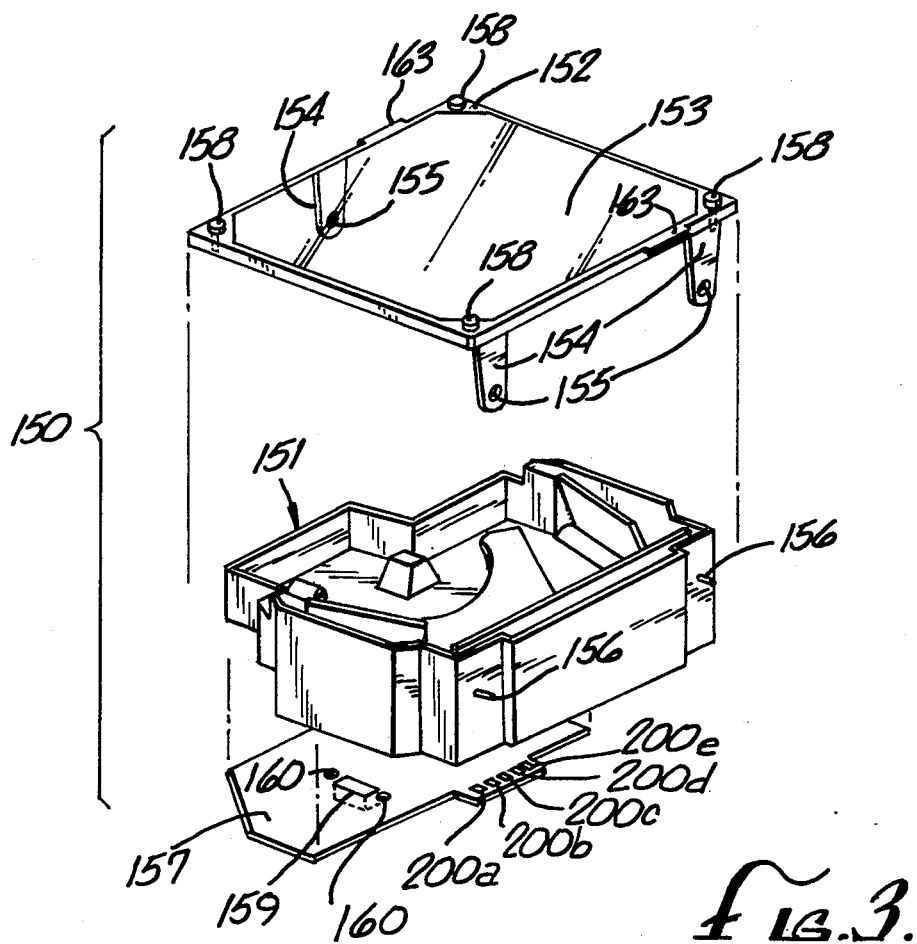
FIG. 3 is an exploded view of a scanner module.

The base enclosure 30 comprises ends 11, 12 and sides 13, 14. An item may be passed over the system 10 in any direction to obtain a bar code read as long as the item passes through the scan pattern of the beams emitted by the scanner. Accordingly, the system 10 may be installed in a countertop in any configuration so that items first pass over any of its ends 11, 12 or sides 13, 14. In a preferred embodiment however, items are passed over system 10 in the direction indicated by arrow 15. In a preferred embodiment, the base enclosure 30 generally defines the outer dimensions of the data gathering system 10. That is, the base enclosure 30 defines the horizontal and vertical planes within which the components of system 10 are generally located. Base enclosure 30 also defines walls which may correspond to the aforementioned planes. As discussed later, the base enclosure 30 is preferably constructed of a rigid material having high tolerances. The base enclosure 30 houses scale module 80 as shown in FIG. 2 and scanner module 150 as shown in FIG. 3.

Referring now to FIGS. 2 and 4–8 (primarily FIG. 4) which depict the base enclosure 30 in more detail, it is shown that the base enclosure 30 includes inner side channels 31a and 31b, intermediate side channels 32a and 32b, outer side channels 33a and 33b, inner end channels 34a and 34b, and outer end channels 35a and 35b. The inner boundary of inner side channels 31 is defined by inner sidewalls 36a and 36b and the outer boundary of inner side channels 31 are defined by first intermediate sidewalls 37a and 37b. First intermediate sidewalls 37 also connect inner side channels 31 to intermediate side channels 32, and define the inner boundary of intermediate side channels 32. The outer boundary of intermediate side channels 32 are defined by second intermediate sidewalls 38a and 38b. Second intermediate sidewalls 38 also connect intermediate side channels 32 to outer side channels 33, and define the inner boundary of outer side channels 33. The outer boundary of outer side channels 33 are defined by outer sidewalls 39a and 39b. Outer sidewalls 39a and 39b respectively define sides 13 and 14 of data gathering system 10.

The inner boundary of inner end channels 34 are defined by inner endwalls 40a and 40b and the outer boundary of inner end channels 34 are defined by intermediate endwalls 41a and 41b. Intermediate endwalls 41 also connect inner end channels 34 to outer end channels 35, and define the inner boundary of outer end channels 35. The outer boundary of outer end channels 35 are defined by outer endwalls 42a and 42b. Outer endwalls 42a and 42b respectively define ends 11 and 12 of data gathering system 10.

Inner side channel floors 43a and 43b connect inner sidewalls 36 and first intermediate sidewalls 37. Intermediate side channel floors 44a and 44b connect first intermediate sidewalls 37 and second intermediate sidewalls 38. Outer side channel floors 45a and 45b connect second intermediate sidewalls 38 and outer sidewalls 39. Inner end channel floors 46a and 46b connect inner endwalls 40 and intermediate endwalls 41. Outer end channel floors 47a and 47b connect intermediate endwalls 41 and outer endwalls 42.

Figure 5:
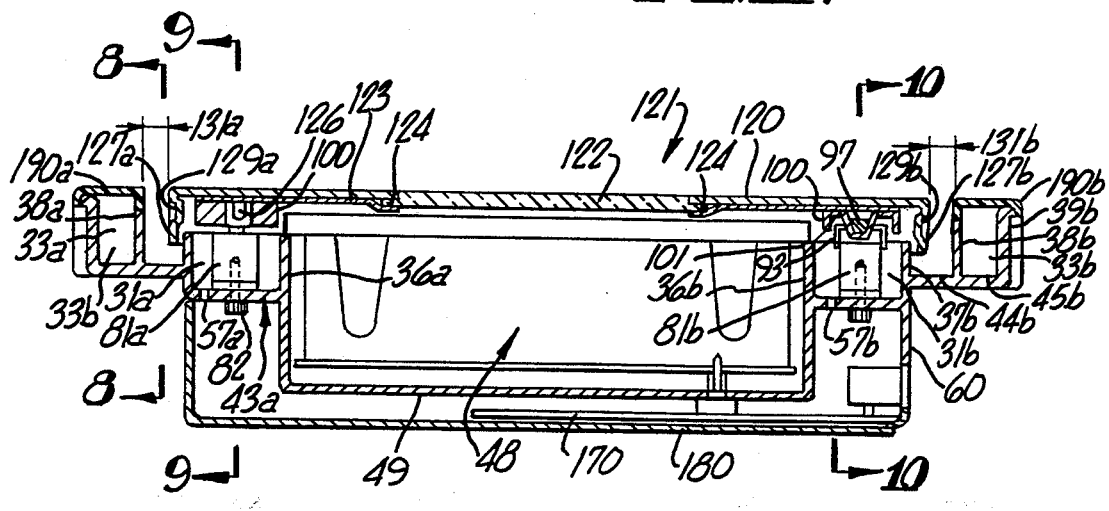
FIG. 5 is a cross-sectional view of the data gathering system of FIG. 1 taken along line 5—5.
Figure 6:
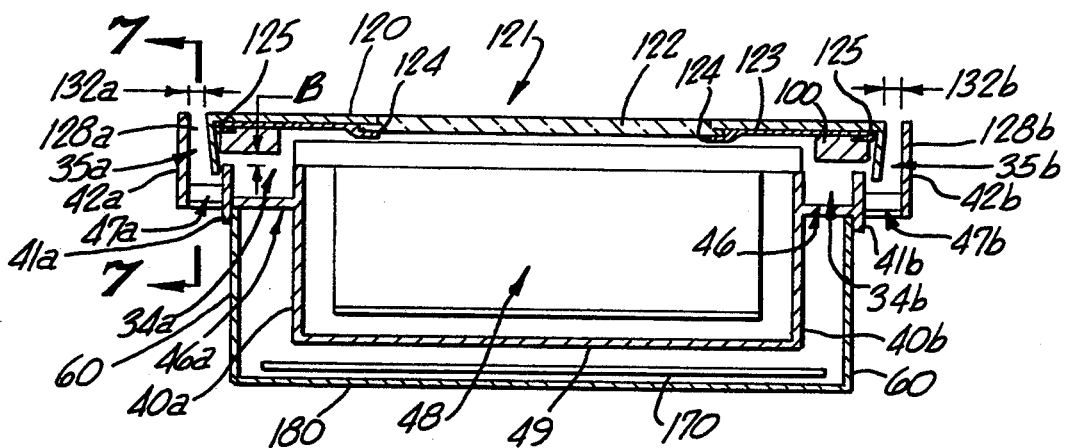
FIG. 6 is a cross-sectional view of the data gathering system of FIG. 1 taken along line 6—6.

As shown in FIG. 4, inner sidewalls 36 and inner endwalls 40 are connected and collectively define central area 48. As shown in FIG. 5, inner sidewalls 36 extend below inner side channel floors 43, and as shown in FIG. 6, inner endwalls 40 extend below inner end channel floors 46. As shown in FIGS. 5 and 6, inner sidewalls 36 and inner endwalls 40 are all connected to central area bottom 49.

Figure 7:
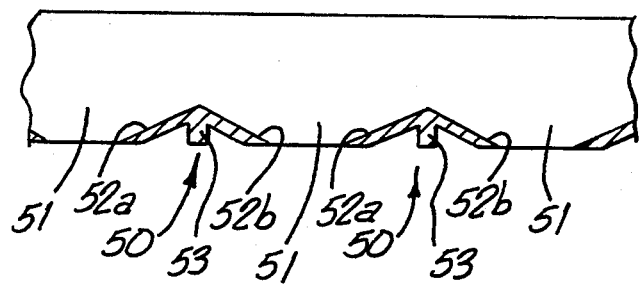
FIG. 7 is a cross-sectional view of the base enclosure of FIG. 6 taken along line 7—7.

In a preferred embodiment, outer end channel floors 47a and 47b comprise a series of deflectors 50 separated by spaces 51 as shown in FIGS. 4 and 7. Each deflector 50 comprises flanges 52a and 52b, and rib 53. Should coins or other debris fall into system 10 in the proximity of outer end channels 35, the slope of flanges 52 will direct them out of system 10 through spaces 51. This arrangement serves to prevent debris from remaining in system 10 which could potentially result in an inaccurate weight reading or damage components within scale module 80 or scanner module 150. Preferably, the deflectors 50 and spaces 51 are sized so that paper currency and credit cards will not pass through spaces 51 providing for retrieval thereof. The robust design of each deflector 50 with its flanges 52a and 52b and rib 53 also serves to maintain the gap between intermediate endwalls 41 and respective outer endwalls 42 which contributes to the preferred overall rigidity of the base enclosure 30. As discussed later, the deflectors 50 also serve to maintain the gap between the endwalls 11 and 12, and the edges of the weigh platter to ensure accurate weight measurements.

Figure 8:
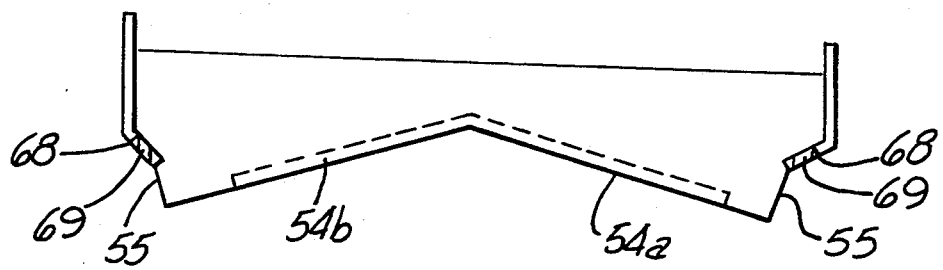
FIG. 8 is a cross-sectional view of the base enclosure of FIG. 5 taken along line 8—8.

Also in a preferred embodiment, intermediate side channel floors 44 and outer side channel floors 45 each comprise sloped flanges 54a and 54b as shown in FIG. 8. At or near the lateral ends of sloped flanges 54a and 54b are spaces 55 located in intermediate side channel floors 44, and spaces 56 located in outer side channel floors 45 as shown in FIG. 4. Spaces 55 and 56 allow coins or other debris which enter system 10 in proximity to channels 32 and 33, to exit system 10. Preferably, spaces 55 and 56 are configured so that paper currency or credit cards will not pass through.

Figure 9:
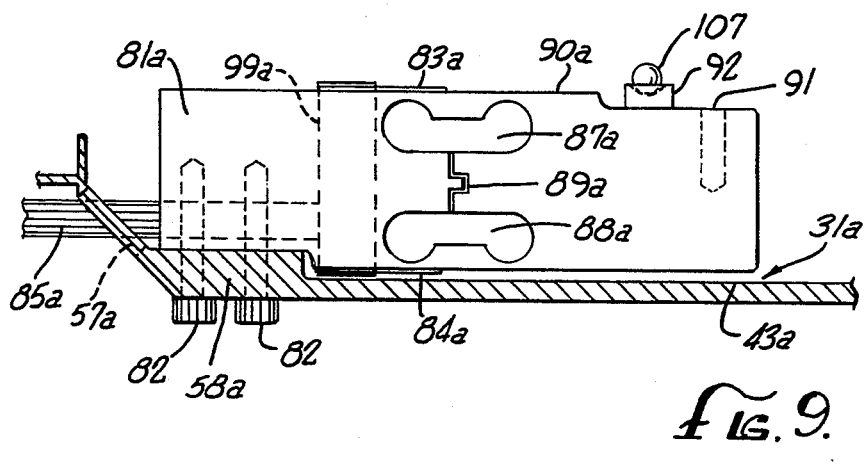
FIG. 9 is a cross-sectional view of the data gathering system of FIG. 5 taken along line 9—9.
Figure 10:
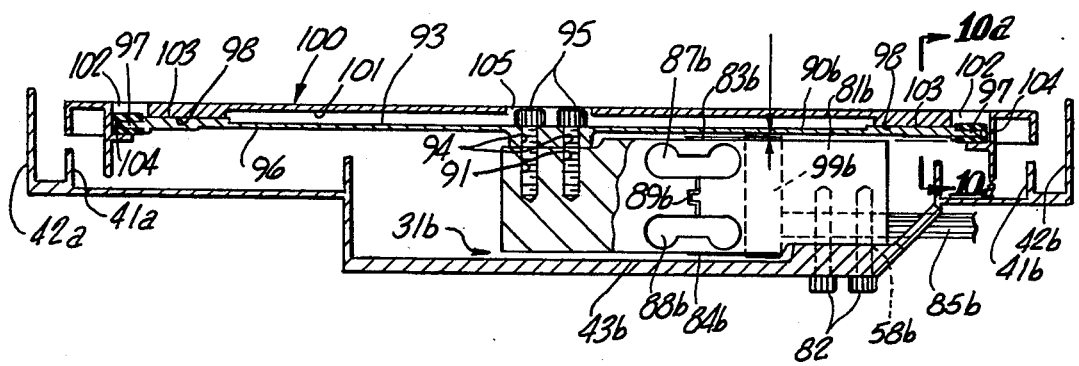
FIG. 10 is a cross-sectional view of the data gathering system of FIG. 5 taken along line 10—10.

As shown in FIGS. 4 and 5, the inner side channel 31a includes slot 57a and inner side channel 31b includes slot 57b. As shown in FIGS. 9 and 10, incorporated into inner side channel floors 43a and 43b are pads 58a and 58b respectively. Pads 58 are raised above inner side channel floors 43 and each pad 58 includes two holes 59.

Referring now to FIGS. 2, 9 and 10, components of scale module 80 are now described. The scale module 80 typically includes the components which receive the force of the weight and transmit this force to associated electronics for further processing. In a preferred embodiment, the scale module 80 may also include these associated electronics which are typically contained on printed circuit boards.

As shown in FIGS. 9 and 10, the scale module 80 includes load cell beams 81a and 81b which are mounted on pads 58a and 58b respectively and which as explained herein, serve to measure the weight of items placed on scale module 80 of data gathering system 10. Load cell beams 81 are secured to pads 58 by bolts 82 which extend through holes 59 shown in FIG. 4. Each load cell beam 81 receives two bolts 82. The pads 58 do not extend along inner side channel floors 43 for the entire length of load cell beams 81 such that a portion of beams 81 overhang pads 58 as best shown in FIGS. 9 and 10.

As shown in FIG. 2, upper strain gauges 83a and 83b and lower strain gauges 84a and 84b are respectively mounted on the top and bottom of load cell beams 81a and 81b. Strain gauges 83 and 84 are attached to the respective load cell beams by any suitable adhesive. Couplers 99a and 99b extend between the upper and lower strain gauges 83 and 84 and are attached thereto by soldered junctions (not shown). Couplers 99a and 99b are also soldered to respective strain gauge connectors 85a and 85b. The connectors 85a and 85b respectively extend through inner side channel floors 43a and 43b via slots 57a and 57b, and beneath inner end channel 34b where they are attached to load cell printed circuit board 86. The load cell printed circuit board 86 is attached to the base enclosure 30 in proximity to the exterior of inner endwall 40b opposite central area 48 by any suitable attachment means (not shown). The load cell circuit board 86 is also connected to main printed circuit board 170 through edge card connector 171 as best shown in FIG. 2. The main board 170 is attached to the base enclosure 30 on the exterior of central area bottom 49 and adjacent to lower flange 60 which protrudes downward. Attached to the base enclosure 30 and lower flange 60 is cover 180 as partially shown in FIG. 2 and which protects the main board 170.

Still referring to FIGS. 2, 9 and 10, extending horizontally through load cell beams 81a and 81b are upper slots 87a and 87b, lower slots 88a and 88b, and load cell beam stops 89a and 89b. Load cell beam stops 89 are essentially winding gaps through beams 81 extending from upper slots 87 to lower slots 88. Hole 91 and cup receptacle 92 are located on the top surface 90a of load cell beam 81a. Holes 91 are located on top surface 90b of load cell beam 81b.

Referring now primarily to FIGS. 2 and 10, a T-bar 93 which includes holes 94, is attached to load cell beam 81b. Holes 94 spatially correspond to holes 91 of load cell beam 81b, and T-bar 93 is attached to beam 81b by bolts 95 which extend through holes 94 and threadably engage holes 91. The T-bar 93 includes a longitudinal channel 96 on its underside. The channel 96 provides that when T-bar 93 is mounted on beam 81b, a gap A is maintained between strain gauge 83b and coupler 99b located on top surface 90b of beam 81b, and channel 96 which represents the bottom of T-bar 93. This gap A avoids contact between T-bar 93, and strain gauge 83b and coupler 99b which contact could interfere with an accurate weighing operation. T-bar 93 further includes end notches 97 and convex portions 98 which are explained herein.

Figure 10A:
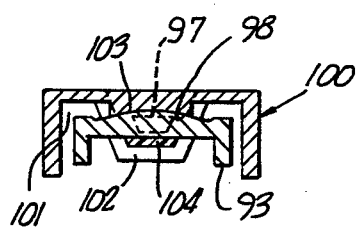

A weigh frame 100 is mounted to T-bar 93 and load cell beam 81a. The weigh frame 100 further includes a channel 101 located on its underside in proximity to the area at which it engages T-bar 93 as shown in FIGS. 10 and 10a. Located at either end of channel 101 are slotted mounts 102 and concave mounts 103. The concave mounts 103 are positioned such that when weigh frame 100 is mounted on T-bar 93, concave mounts 103 rest on convex portions 98. Also when weigh frame 100 is mounted on T-bar 93, end notches 97 of T-bar 93 are fit within slotted mounts 102 of weigh frame 100. End notches 97 may be fitted with rubber grommets 104 so that grommets 104 are interposed between end notches 97 and slotted mounts 102 as shown in FIG. 10 and partially shown in FIG. 10a. The weigh frame 100 also includes slot 105 as shown in FIGS. 2 and 10 to expose bolts 95 which attach T-bar 93 to load cell beam 81b. Slot 105 is sufficiently large so that bolts 95 may be removed while weigh frame 100 is still mounted to T-bar 93.

On the underside of the weigh frame 100 in proximity to the area at which it engages load cell beam 81a, the weigh frame 100 includes a cup receptacle (not shown). This cup receptacle is located so that when weigh frame 100 is mounted on beam 81a, the cup receptacle is positioned above cup receptacle 92 of load cell beam 81a as shown in FIG. 9. When the weigh frame 100 engages load cell beam 81a, ball bearing 107 is located so that it is positioned within cup receptacle 92 and the cup receptacle on the underside of weigh frame 100. As shown in FIG. 2, weigh frame 100 also includes a hole 108 which itself includes a recessed portion (not shown). Hole 108 corresponds to hole 91 on the top surface 90a of load cell beam 81a. Shoulder bolt 109 extends through hole 108 and threadably engages hole 91 thereby retaining the weigh frame 100 on beam 81a in X, Y and Z axes.

When the shoulder bolt 109 is tightened, it does not actually impinge on the weigh frame 100 so that the weigh frame 100 may still rotate about axis 110a which is centered through ball bearing 107 and is parallel to ends 11 and 12 of the base enclosure 30. The interface between concave mounts 103 of weigh frame 100 and convex portions 98 of T-bar 93, as well as the resiliency of rubber grommets 104, allow the weigh frame 100 to advantageously rotate about axis 110b which is centered through convex portions 98 and is perpendicular to axis 110a.

The weigh frame 100 is preferably constructed of rigid material and design. To this end, the weigh frame 100 may include structural ribs (not shown) located on the underside of weigh frame 100 which help preserve the structural integrity of weigh frame 100 during a weighing operation. Weigh frame 100 may also include indentations 112 and holes 113 which are discussed later.

Removably mounted on weigh frame 100 is platter 120 on which items to be weighed are placed. Platter 120 includes hole 121 which is covered by transparent platter window 122 which itself is mounted to the underside of platter 120. The platter window 122 provides passage for the scanning beams emanating from scanning module 150 and the scattered light returning from the scanned item. Preferably, platter window 122 is constructed of a material such as sapphire which is resistant to scratching and other wear so that items to be weighed and scanned do not cause significant damage to platter window 122. Alternatives for providing that window 122 is resistant to wear are discussed in U.S. patent application Ser. No. 07/647,540, filed Jan. 29, 1991 the disclosure of which is incorporated herein by reference.

As shown in FIGS. 5 and 6, window 122 is attached to the underside of platter 120 by plate 123 which includes four tabs 124 which overlap the perimeter of window 122. The plate 123 may be held to the underside of platter 120 by a suitable adhesive. The plate 123 also includes studs 126 which extend downwardly and are positioned to engage holes 113 of weigh frame 100 when platter 120 is placed thereon. Platter 120 includes downwardly extending side flanges 127a and 127b as shown in FIGS. 2 and 5, and downwardly extending end flanges 128a and 128b as shown in FIGS. 2 and 6 forming an enclosed space on the underside of platter 120. Side flanges 127 may include indentations 129a and 129b to allow one to grip the platter 120 thereby facilitating removal of platter 120 from the weigh frame 100.

When mounted on weigh frame 100, the platter 120 may rest on magnetic retention strips 130 which themselves are attached to weigh frame 100 by any suitable means such as a strip of dampening material with adhesive on both its sides (not shown). Studs 126 also engage holes 113 to guide the platter onto the weigh frame 100. When mounted on weigh frame 100, gaps are formed and maintained between the various platter flanges and the walls of the base enclosure 30 in proximity thereto. Specifically as shown in FIG. 5, gap 131a is maintained between platter side flange 127a and second intermediate sidewall 38a. Gap 131b is maintained between platter side flange 127b and second intermediate sidewall 38b. Gap 132a is maintained between platter end flange 128a and outer endwall 42a. Gap 132b is maintained between platter end flange 128b and outer endwall 42b. The downwardly extending platter side flanges 127a, 127b and end flanges 128a, 128b overlap the corresponding intermediate sidewalls 38a, 38b and outer endwalls 42a, 42b to prevent debris such as crumbs or spilled liquid from falling into the central area 48. The side flanges 127 and end flanges 128 may also be angled inward so as to facilitate easy mounting onto weigh frame 100 in relation to the walls of base enclosure 30. Additionally, the inward angle of the platter flanges 127, 128 and gap maintenance also provide that if particulate matter falls between the platter 120 and base enclosure 30, the particulate matter will not remain lodged therebetween which could interfere with an accurate weighing operation.

Gaps 131 and 132 provide that platter 120 is not contacted by walls 38 and 42 of base enclosure 30 during a weighing operation. In a preferred embodiment, base enclosure 30 is constructed of a rigid material such that it, and particularly ends 11 and 12 and sides 13 and 14, do not flex should system 10 be installed into a countertop with an improperly dimensioned hole. This rigid construction provides that gaps 131a, 131b and 132a, 132b are maintained such that second intermediate sidewalls 38 and outer endwalls 42 do not impinge on platter 120 which could result in rubbing or interference thereby producing an inaccurate weight measurement.

A typical weighing operation is now described. An item to be weighed is placed on platter 120 thereby exerting a downward force on platter 120. This downward force is transmitted to the weigh frame 100. The weigh frame 100 is mounted to load cell beams 81a and 81b essentially through three points: ball bearing 107 in proximity to beam 81a as shown in FIG. 9, and the ends of T-bar 93 at the interface between the end notches 97, rubber grommets 104 and slotted mounts 102, and the interface between the convex portions 98 and concave mounts 103 in proximity to beam 81b as shown in FIGS. 10 and 10a. The ball/cup arrangement allows rotation about axis 110a while the concave/rubber grommet/convex arrangement allows rotation about axis 110b thereby effectively incorporating two independent load cell systems into one. Furthermore, with this mounting arrangement, no matter where the item is placed on platter 120, the system will resolve the deflection to provide an accurate weight measurement.

The downward force experienced by weigh frame 120 is respectively transmitted to load cells 81a and 81b through the ball bearing 107 and T-bar 93 as discussed above. As load cell beams 81 experience this downward force, they are deflected downward in their sections which extend beyond pads 58. This deflection is facilitated by upper slots 87 and lower slots 88 which increase the flexibility of load cell beams 81. The beams 81 may vertically deflect only a certain amount until the edges of the load cell beam stops 89a and 89b contact each other as can be seen in FIGS. 9 and 10. In a preferred embodiment, the beam stops 89 are configured such that they will prevent deflection of beams 81 beyond the elastic range of the material comprising beam 81. Similarly, the base enclosure 30 is constructed so that only a certain distance, gap B, exists between the weigh frame 100 and the base enclosure 30 as shown in FIG. 6. This provides that the weigh frame 100 will contact base enclosure 30 before weigh frame 100 might deform plastically. The above precautions safeguard against situations such as when a heavy item is dropped on platter 120.

Upper strain gauges 83 and lower strain gauges 84 detect the amount of strain caused by vertical deflection of beams 81. This data is electronically sent through couplers 99a, 99b and strain gauge connectors 85a, 85b to load cell printed circuit board 86 and main printed circuit board 170 which convert the electrical information into a weight measurement. The weight measurement may then be transmitted to an input/output receptacle (not shown) which may be designed to receive a plug and cable. The input/output receptacle may also be attached to main board 170 and lower flange 60 extending downwardly from base enclosure 30. Preferably, flange 60 is part of base enclosure 30. A suitable plug and cable (not shown) connected to the input/output receptacle may then transmit the weight information to the point of sale system. As discussed below, the input/output receptacle may also operate to send information from scanner module 150 and the cable may transmit information from both the scale and scanner modules. The input/output receptacle may also transmit information from the point of sale system to the data gathering system 10.

The precise vertical location of load cell beams 81 is important in ensuring a proper weight measurement. Accordingly, pads 58a and 58b are preferably constructed with high tolerances so that they position beams 81 at the proper vertical location. In a preferred embodiment, pads 58a and 58b are incorporated into base enclosure 30 as is possible with casting techniques. In this preferred embodiment only a minimal amount of post-casting machining is necessary and separate, attachable pads are unnecessary.

Figure 3A:
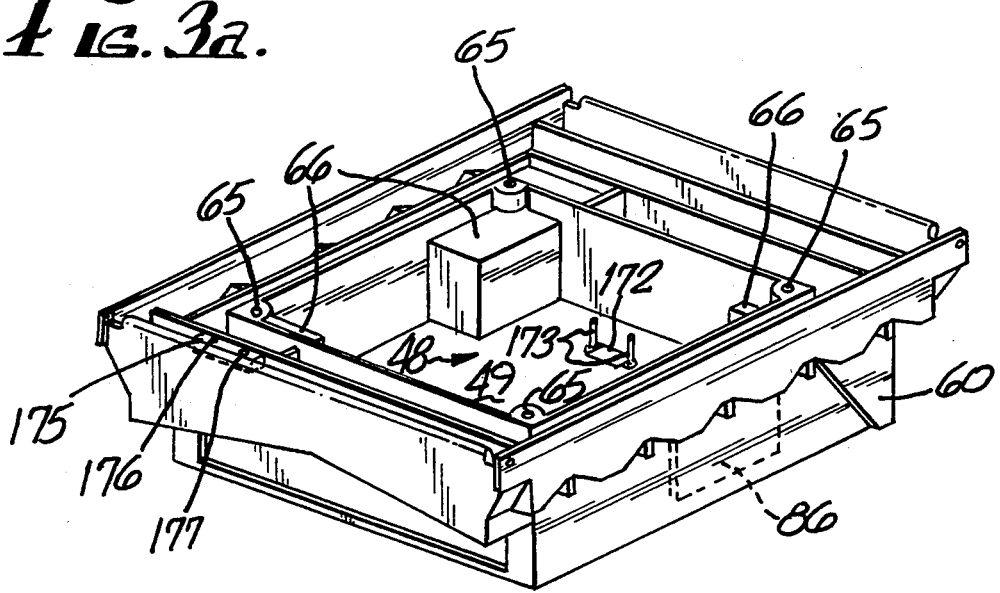
FIG. 3a is a perspective view of a base enclosure showing features to mount a scanner module.

Referring to FIGS. 3 and 3a, components of the scanner module 150 are now described. As similarly described with the scale module 80, the scanner module 150 typically includes the components which serve to scan the item and transmit the information from the scanned item to associated electronics. In a preferred embodiment, the scanner module 150 may also include these associated electronics which are typically contained on printed circuit boards.

Scanner module 150 comprises a housing 151 which contains the scanner components such as a light source, mirror array, collection optics and detector (all not shown). These components produce the scanning beam pattern and detect the light reflected or scattered off an item being scanned, such as the bar code on a consumer product. A suitable scanner configuration is described in U.S. Pat. No. 4,799,164 issued Jan. 17, 1989, the disclosure of which is incorporated herein by reference. A scanner frame 152 is attached to the top of housing 151. The scanner frame 152 houses scanner window 153 which allows passage of the outgoing scanning beam pattern as well as the scattered light reflected back the scanned item. The scanner window 153 may be attached to frame 152 by an adhesive or other fastening device such as rivets or tabs (not shown).

The scanner frame 152 includes frame legs 154 which extend downwardly from frame 152. Legs 154 include holes 155 to engage housing pegs 156 which extend outwardly from housing 151, thereby serving to attach frame 152 and window 153 to housing 151. Mounted to the bottom of housing 151 is a scanner printed circuit board 157 which serves to process the signals received from the detector which reads the items to be scanned. The scanner board 157 is mounted to housing 151 by any suitable means such as tabs and receives the information from the scanned item through a suitable photo detection and signal processing system.

The manner in which scanner module 150 is inserted into base enclosure 30 is now described. Scanner module 150 is inserted into central area 48 of base enclosure 30 and scanner frame lips 163 may be positioned on frame 152 to provide means to handle scanner module 150 during insertion. The corners of scanner frame 152 include bolts 158 which threadably engage base enclosure 30 through scanner support holes 65 which, in a preferred embodiment, are incorporated into the base enclosure 30 itself as best shown in FIG. 4.

As shown in FIGS. 3 and 3a, included in scanner board 157 is scanner board connector 159 and scanner board receptacles 160 which respectively engage floating connector 172 and floating connector studs 173 which are mounted to base enclosure 30 through a hole in central area bottom 49. The floating connector 172 and guide studs 173 are attached to each other and may move laterally and longitudinally so that they may "blindly" engage scanner board connector 159 and receptacles 160 as scanner module 150 is inserted into central area 48. This lateral movement is shown by the phantom dashed lines surrounding floating connector 172 and studs 173 in FIG. 4. Movement of the floating connector 172 and studs 173 is helpful given that when scanner module 150 is inserted into central area 48, one may not be able to visually direct connector 159 to properly engage floating connector 172.

Placement of scanner module 150 in base enclosure 30 central area 48 is also facilitated by scanner guides 66 as shown in FIG. 3a. In a preferred embodiment, scanner guides 66 are contiguous indentations in central area bottom 49, inner sidewalls 36a and 36b, and inner endwalls 40a and 40b. Scanner guides 66 are also preferably incorporated into the base enclosure 30 itself when the base enclosure 30 is cast or otherwise constructed, as opposed to being separate parts requiring attachment to base enclosure 30. The scanner guides 66 are configured to conform with the perimeter of housing 151 which itself substantially defines the perimeter of scanner module 150. This construction, along with the placement of scanner board connector 159, ensures that scanner module 150 is inserted into base enclosure 30 in the proper orientation.

Viewed from the bottom of base enclosure 30, the indentations of scanner guides 66 also provide a space in which electrical components mounted on main printed circuit board 170 and which protrude upwardly therefrom towards the exterior of central area bottom 49, may reside. This arrangement allows that main board 170 may be mounted closer to the exterior of central area bottom 49 thereby decreasing the overall vertical dimension of data gathering system 10.

Assembling the scanner components described above results in a self-contained scanner module 150 which may be easily inserted or removed as a unit into central area 48 of base enclosure 30. Removing platter 122 exposes scanner frame bolts 158 which may be turned by a suitable means such as a philips head screwdriver from above data the gathering system 10. This accessibility allows for easy installation and removal of scanner module 150 into and from base enclosure 30 without removal of data gathering system 10 from the countertop. Insertion and removal of scanner module is also facilitated by the fact that once platter 120 is removed, no other scale module components block insertion and removal. Removal of scanner module 150 from base enclosure 30 is further facilitated by scanner frame lips 163 which are positioned correspondingly with indentations 112 on weigh frame 100.

In operation, an item to be scanned is passed over platter window 122 which is aligned with scanner window 153. The scanning beams emanating from scanner module 150 pass through windows 153 and 122, scatter off the bar code or other indicia on the item being scanned, return and are detected in the scanner module 150. The information is fed into scanner board 157 and then into main board 170 through scanner board connector 159 and floating connector 172. Once processed by scanner board 157 and main board 170, information revealing whether the bar code read was successful or not is transmitted to a cable (not shown) which is mounted to main board 170. The other end of the cable is attached to indicator 175 as shown in FIG. 3a which notifies the checkout clerk whether the bar code read was successful or not.

The indicator 175 is housed within outer side channel 33a of base enclosure 30 so that it does not protrude above the top edge of second intermediate sidewall 38a and outer sidewall 39a. This housing arrangement further facilitates the compact overall dimensions and low profile of data gathering system 10. Included in indicator 175 are good read light 176 and scale-at-zero light 177 which may be green and yellow respectively. Good read light 176 may actually serve two purposes: (1) shine dimly to indicate system 10 is turned on and (2) shine brightly to indicate the bar code read was successful. An audible "beep" may also accompany bright illumination of the good read light 176. Should the good read light 176 not shine brightly or the beep not sound upon an item being scanned the checkout clerk is notified rescanning is necessary. The scale-at-zero light 177 may simply turn off to indicate a weight measurement is occurring or that the scale is not at zero.

Also, a calibration and zeroing-out component may be located in a channel of base enclosure 30. Such a component, which allows the scale to be calibrated to ensure accurate weight measurements, is described in U.S. Pat. No. 5,086,879 issued Feb. 11, 1990, the disclosure of which is incorporated herein by reference.

The scanner board 157, and main board 170 discussed earlier in connection with processing weight information may also process the information from the scanned item for transmission via an input/output receptacle (not shown) mounted on main board 170 and attached to lower flange 60. This input/output receptacle may be the same input/output receptacle discussed in connection with the weight information. A suitable plug and cable may plug into the input/output receptacle and preferably be able to transmit both scanner and weight information to the point of sale system as well as receive information from the point of sale system. Interfaces and cables which may transmit more than one type of information suitable for this embodiment are disclosed in U.S. Pat. No. 5,008,518 issued Apr. 16, 1991, the disclosure of which is incorporated herein by reference.

Figure 1A:
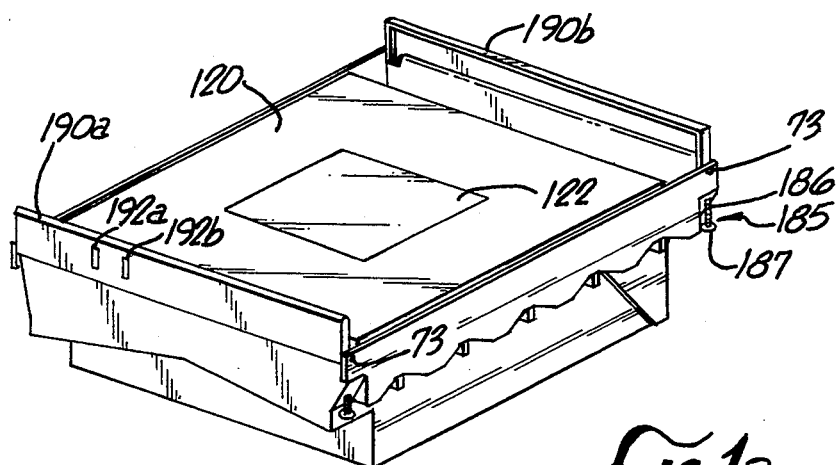
FIG. 1a is a perspective view of a data gathering system with panels opened and system mounts feet shown.

Additional features of the base enclosure 30 are now further described. As shown in FIG. 4, included at the corners of base enclosure 30 are system mount supports 68 which are preferably incorporated into base enclosure 30 and which each include a hole (not shown). Mounted to supports 68 are system mounts 185 which include axial members 186 as shown in FIG. 1a. Members 186 are secured to system mount supports 68 through the holes (not shown) by means such as threadable engagement. System mounts 185 also include pods 187 attached to the bottom of axial members 186. The pods 187 rest on a designated ledge area within the counter and serve to support base enclosure 30 therein.

The top of axial members 187 are accessible from above data gathering system 10 as shown in FIG. 4, and may include a nut and slot 188 so that the axial member 186 may be turned by a suitable tool such as a screwdriver. Such turning results in vertical height adjustment of the base enclosure 30. In a preferred embodiment, the platter 120 is positioned about 0.06 inches above the top of the base enclosure 30. In operation, the position of the base enclosure 30 is adjusted so that the top of base enclosure 30 is level and flush with the countertop and the platter 120 is slightly above the counter so that the countertop does not interfere with a weigh operation. This adjustment may be conducted without the use of special tools and without requiring that base enclosure 30 be removed from the countertop multiple times in the iterative leveling process required by many existing systems.

Furthermore, system mounts 185 are positioned within the vertical dimension of the base enclosure 30 in generally the same horizontal plane and in lateral proximity to the scanner module 150 and scale module 80, instead of on the bottom of the base enclosure 30. The base enclosure 30 is thus suspended by system mounts 185 instead of resting above and thereon. This arrangement helps maintain the low vertical profile of the data gathering system 10. Furthermore, the countertop need only provide a ledge on which to support the base enclosure 30 instead of providing a support structure underneath.

As shown in FIGS. 2 and 4, the base enclosure 30 also includes panel gaps 72 located at both ends of outer sidewalls 39a and 39b at the four corners of base enclosure 30. Located at both ends of outer endwalls 42a and 42b and in proximity to panel gaps 72 are panel holes 73. Panels 190a and 190b fit within panel gaps 72 and include panel pins (not shown) located at each of their ends which are inserted into panel holes 73. The panel pins rotate in holes 73 so that panels 190 may pivot and thereby be opened and closed.

FIG. 1 shows panels 190a and 190b in a closed position whereby they respectively cover outer side channels 33a and 33b. Panel 190a also includes indicator windows 192a and 192b which are positioned to correspond to the good read light 176 and scale-in-use light 177 of indicator 175 which is contained in outer side channel 33a. Thus when panel 190a is closed the checkout clerk is still notified whether the bar code read was successfully and whether the scale is activated. FIG. 1a shows panels 190 in an open position thereby exposing outer side channels 33. When opened, panels 190 expose the slots 188 of leveling feet 185 for adjustment of base enclosure 30 as well as provide access to indentations 129 on platter side flanges 127 to allow easy removal of platter 120.

In their open position, panels 190 may be grasped thereby serving as lift handles to allow system 10 to be easily installed into and removed from the countertop without the need for special tools. The additional feature of built-in lift handles provided by panels 190 represents a significant departure from existing systems which are bulky in the first place, and which are difficult to handle due to the lack of handles integrated into the system.

The base enclosure 30 generally houses both scale module 80 and scanner module 150 thereby providing protection for the components of these modules. In a preferred embodiment, most of the scale module 80 and scanner module 150 are housed within the base enclosure 30 so that many of their components are contained within the horizontal and vertical planes defined by the base enclosure. As noted earlier, the base enclosure generally defines the outer dimensions of data gathering system 10. However, it will be recognized that certain components or portions of the scale and scanner modules might reside outside of these planes (e.g., scale or scanner electronics). In this case, the scale or scanner modules would still be viewed as being housed within the base enclosure because the majority of the scale and scanner modules and their components are still housed within the aforementioned planes.

Also, in a preferred embodiment, most of the components comprising scale module 80 are housed within base enclosure 30 but are positioned so that they generally surround scanner module 150. Such positioning provides that the scanner module 150 is positioned generally within the scale module 80 and that the modules are arranged in a generally concentric manner. This arrangement also provides that many of the components comprising scale module 80 and scanner module 150 are vertically positioned so that they are generally located between upper and lower boundaries. Such positioning provides that the scale module 80 and scanner module 150 are spatially integrated so that the two modules may occupy the same horizontal plane.

Integrating the positions of both scale module 80 and scanner module 150 within the same base enclosure and on the same horizontal plane is a significant departure from existing data gathering systems. This is evidenced by the fact that most existing data gathering systems either (1) locate the scanner on top of the scale thereby providing no horizontal integration; (2) locate the scale around the scanner whereby the scale is only partially horizontally integrated with the scanner but where the scale itself serves as the enclosure and is thus not protected by a separate base enclosure, or (3) employ a vertical scanner which may only be partially horizontally integrated with the scale but in any event is not housed along with the scale in a single base enclosure.

In contrast the preferred embodiment provides that the vertical dimensions of scale module 80 and scanner module 150 are not cumulative in relation to the overall vertical dimension of data gathering system 10 unlike the existing systems described above. Instead, the vertical dimension of the preferred embodiment is defined primarily by the height of base enclosure 30 which houses the components of both the scale and scanner. In preferred embodiments, the overall vertical dimension of data gathering system 10 is 8.5 inches (21.6 cm) or less, or more preferably 4 inches (10.2 cm). Maintaining a low vertical profile generally facilitates easy installation and handling especially in light of built-in lift handles, and is especially useful in stores where the checkout clerk sits with his or her legs underneath the counter.

In the preferred embodiment providing horizontal integration with a low vertical profile, the footprint of system 10 is still not increased. This is because base enclosure 30 positions electrical components of system 10 so that they may support both scanner and scale modules rather than just one or the other which eliminates the need for additional space to house duplicative components. Many of these electrical components including the power supply, interface circuitry, control processor, control firmware and configuration storage components are located on main board 170. Furthermore, main board 170 is positioned so that it may be connected to load cell board 86 through edge card connector 171, as well as scanner board 157 through floating connector 172 while only using a small amount of space. This too is a significant departure from existing data gathering systems whose width significantly increases when locating the scanner module alongside the scale module instead of on top of it. The overall footprint of data gathering system 10 is again preferably defined by base enclosure 30. The platter 120 is another example of a component performing a dual role as it serves to protect both the scale module 80 and scanner module 150 from spilled substances or the like.

In addition to providing that the scale module 80 and scanner module 150 occupy the same horizontal plane, base enclosure 30 provides that other components such as system mounts 185 and indicator 175 also occupy the same horizontal plane. Overall, in the preferred embodiment, base enclosure 30 integrates the locations of scale module 80 and scanner module 150 so that they can reside on the same horizontal plane, and spatially intermixes the components comprising system 10 to achieve a low vertical profile and reduced footprint.

The base enclosure 30 also contributes to the ease in which these modules may be removed. For example, as shown by FIGS. 2 and 3, scanner module 150 may be removed from system 10 by merely removing the platter 120 and loosening scanner frame bolts 158. Once platter 120 has been removed, there are no other components to block removal of the scanner module 150 as one unit, as weigh frame 100 may be constructed so that it does not obstruct the removal path of scanner module 150. Furthermore, removal of scanner module 150 is not necessary to remove or gain access to scale module components such as weigh frame 100. And removal of weigh frame 100 further allows access to strain gauge weigh beams 81. Thus different components of the data gathering system 10 may be removed without unnecessary disassembly of other components.

The base enclosure 30 is preferably constructed in one piece from a die casting or other manufacturing process which results in a finished piece exhibiting high dimensional tolerances. Aluminum or other materials suitable for this type of manufacture and which exhibit high rigidity so that the aforementioned high tolerances can be maintained are preferred. Rigid materials which are also light in weight are preferred so that the resulting data gathering system 10 is more easily handled during installation and removal.

The high tolerances exhibited by base enclosure 30 ensure, for example, that proper gaps are maintained between the scale flanges 127 and 128 and the outer end walls 42 and second intermediate sidewalls 38. The base enclosure 30 thus renders unnecessary a separate casing to protect the scale module 80 from an improperly dimensioned countertop hole. The high tolerances also ensure that scanner support holes 65 are accurately located to facilitate installation of scanner module 150, that pads 58 ensure correct positioning of load cell beams 81, and that a proper gap B exists between the weigh frame 100 and base enclosure 30.

The diagnostic capabilities of the preferred embodiment are now described. Upon turning on system 10, self-diagnostic checks may be automatically performed by system 10 itself to check the functioning of components such as the ROM, RAM, motor, remote display and visible diode laser. These self-diagnostic checks require that the microprocessor (not shown) of data gathering system 10 be operating. A certain number of audible beeps may then be produced by system 10 in order to indicate any existing problems. Because failures which occur in existing data gathering systems may be caused by a variety of problems within the system however, the preferred embodiment provides additional diagnostic capabilities which may pinpoint a problem source without the need for the system microprocessor to be functional.

One possible failure associated with data gathering systems occurs when the motor contained in the scanning unit malfunctions, or the laser does not turn on. With such a failure, existing systems may require that the scanner be removed and probed with test equipment to determine whether the problem is within the motor, the printed circuit board which drives the motor, or the laser. In a preferred embodiment, system 10 includes diagnostic capabilities which provide that the source of the failure within scanner module 150 may be readily located.

As shown in FIG. 3, integrated into scanner board 157 are five LED failure indicators 200a–e which are located near the edge of scanner board 157. Scanner housing 151 is configured such that it has an indentation 162 in proximity to that part of scanner board 157 at which failure indicators 200a–e are located. Accordingly, when the scanner board 157 is mounted to the bottom of housing 151, failure indicators 200 are visible from above scanner module 150. The platter 120 may be easily removed by hand to expose indicators 200 which are visible through scanner window 152 to determine the source of the failure. The scanner module need not be removed and probed with test equipment at this point which greatly facilitates diagnosis and maintenance in the field.

Certain of the failure indicators 200a–e which each pertain to different types of failures in scanner module 150, will light up depending on the source of the failure. In a preferred embodiment, failure indicators 200 are designated as follows: 200a—LF: laser failure; 200b—ME: motor enable; 200c—TO: transistor lodged open; 200d—HF: hall failure; and 200e—TS: transistor shorted. As mentioned above, operation of these indicators do not require that the system 10 microprocessor be working. Appearing below is a scanner module problem analyzing procedure.

Condition

A no motor condition exists when the following symptoms are observed:

The motor is not spinning or won't come up to speed. The laser is not on. Usually accompanied by two tones, If the Motor is noisy, change the Motor.

Procedure

1. View the condition of the LED failure indicators located on the Analog PCB.
2. If the "ME~" LED is not on, go to 3.
    2.1 If the "ME~" LED is on, is the "TS" LED on?
        2.1.1 If the "TS" LED is on, change the Analog PCB.
        2.1.2 If the "TS" LED is not on, change the Main-I/F PCB.
3. If the Motor is spinning, go to 5.
    3.1 If the Motor is not spinning and the "TO" LED is not on, go to 4.
    3.2 If the Motor is not spinning and the "TO" LED is on, is the "HF" LED on?
        3.2.1 If the "HF" LED is on, change the Motor.
        3.2.2 If the "HF" LED is not on, change the Analog PCB.
4. If the Motor is not spinning and the "TO" LED is not on, is the "TS" LED on?
    4.1 If the "TS" LED is not on, change the Motor.
    4.2 If the "TS" LED is on, change the Analog PCB.
5. If the Motor is spinning and the "HF" LED is on, change the Motor.
    5.1 If the "HF" LED is not on, is the "TO" LED on?
        5.1.1 If the "TO" LED is on, change the Analog PCB.
        5.1.2 If the "TO" LED is not on, change the Motor.

Figure 11:
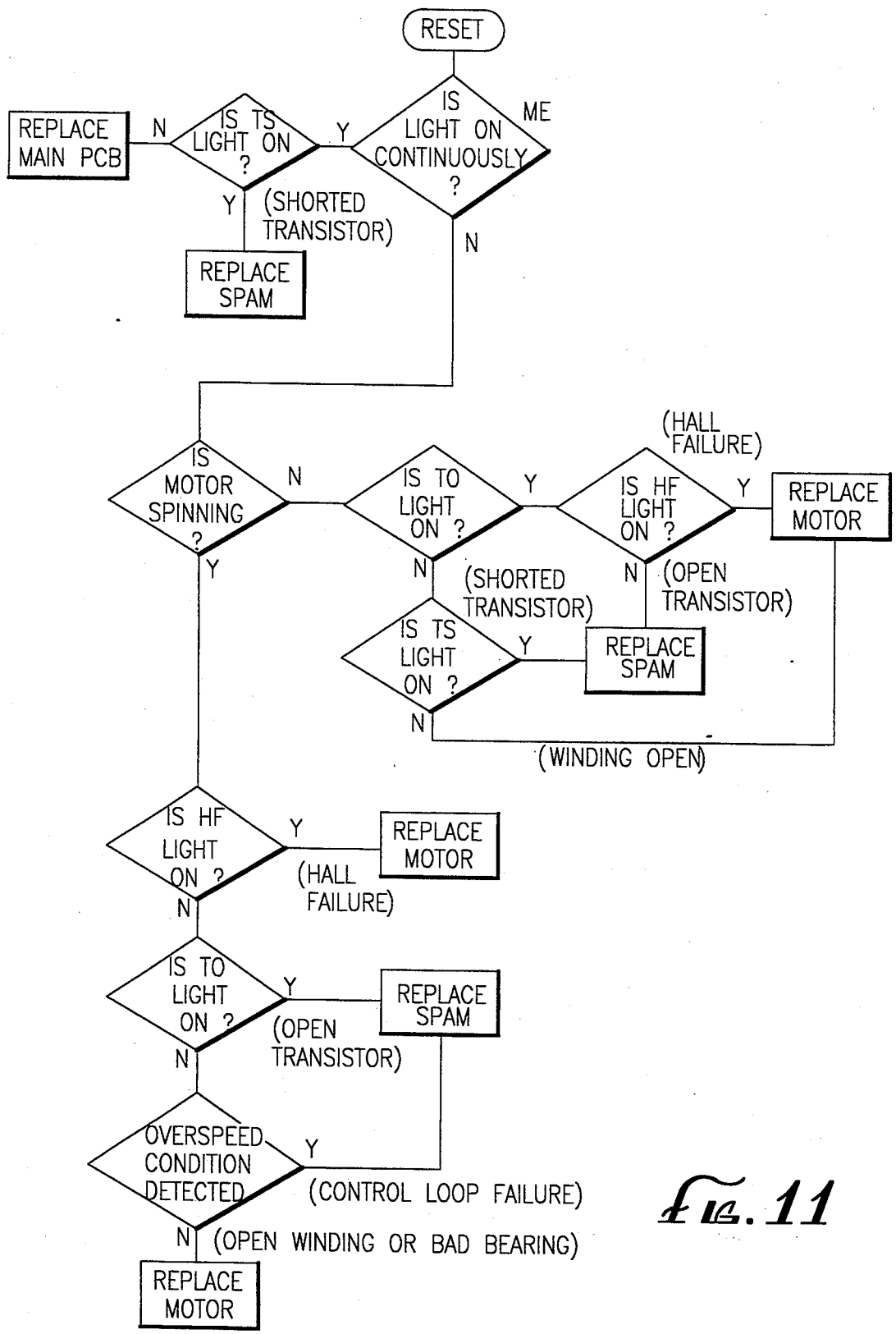
FIG. 11 is a flow chart outlining diagnostic steps.

As shown, the person analyzing the motor failure will be informed as to which components need replacing depending on which indicators 200 are illuminated. FIG. 11 is a flow chart corresponding to the procedure outlined above. FIGS. 12a, 12b and 12c are schematics depicting the preferred circuitry configuration which provides that indicators 200 will illuminate when certain failures have occurred.

In addition to failure indicators 200, the preferred embodiment also includes diagnostic circuitry allowing one to determine which of any subsystems included in data gathering system 10 has failed. While existing systems may include self-diagnostic circuitry such as that described above, this circuitry typically requires that the microprocessor in the subsystem being diagnosed be operating. Should the microprocessor fail, such self-diagnosis is not possible. In the preferred embodiment, the diagnostic capability is not dependent on that subsystem's microprocessor. Instead, a simple electrical parameter such as voltage, resistance or current may be measured at easily accessible measurement points to determine which subsystem has failed.

Figure 13:
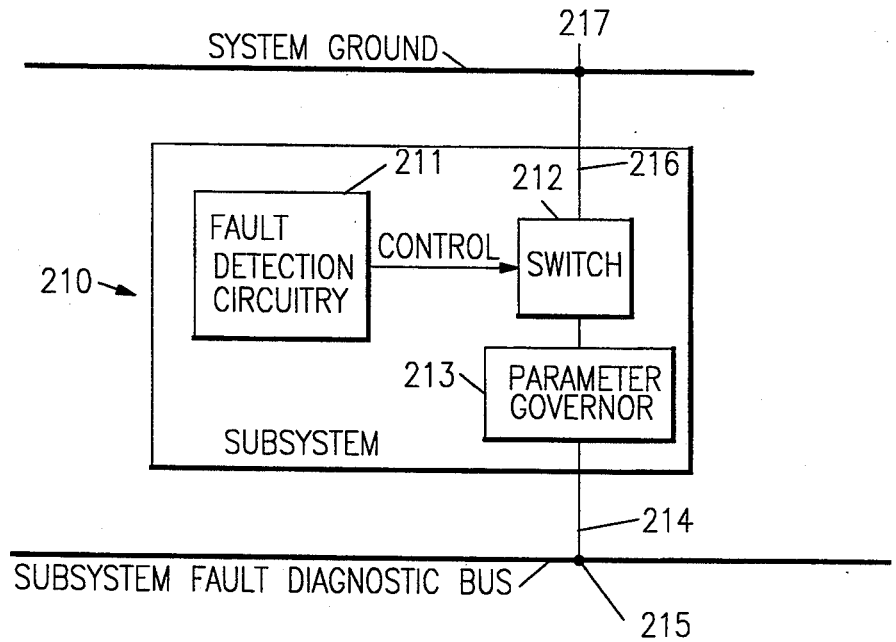
FIG. 13 is a schematic of a subsystem diagnostic circuit.

In the preferred embodiment, each subsystem such as scale module 80 and scanner module 150 includes a subsystem diagnostic circuit 210 as shown in FIG. 13, and the main board 170 contains a diagnostic circuit 210 for the scale module 80 and scanner module 150. Alternatively, a subsystem diagnostic circuit 210 may be installed to isolate any component of the scanner, scale or printed circuit boards of system 10. This would allow easy diagnosis of problems associated with specific components.

Included within each diagnostic circuit 210, is fault detection circuitry 211 which may be tailored to the complexity of the scale module 80 and scanner module 150. Also included in each diagnostic circuit 210 is an electronic switch 212 which is controlled by fault detection circuitry 211 and which regulates the value of an electrical parameter such as voltage, resistance or current.

An electrical parameter generator 213 is attached to switch 212 which generates an electrical parameter such as voltage, resistance or amperage. The generator 213 is attached to diagnostic bus 215 by a line 214. Each subsystem in the data gathering system 10 would include a line similar to line 214 such that a plurality of lines would connect each diagnostic circuit 210 to the diagnostic bus 215 as shown in FIG. 13. Attached to switch 212 is line 216 which extends to a system test ground point 217. Each subsystem in data gathering system 10 would include a line similar to line 217 so that a plurality of lines would connect each diagnostic circuit 210 to system test ground point 217. Preferably, the diagnostic bus 215 and system test ground point 217 are located for easy access by a standard test device such as a voltmeter or ohmmeter as shown in FIG. 14.

The operation of the fault diagnostic circuits 210 are now described. Assuming the subsystem diagnosis will be based on resistance, parameter generator 213 is a resistor and each fault diagnostic circuit 210 will include a resistor 213 having a different value. Upon failure of a subsystem, fault detection circuitry 211 changes the state of the electronic switch 212. Switch 212 then applies or removes the resistance provided by generator 213 of that subsystem to or from diagnostic bus 215. Accordingly, the fault detection circuitry 211 would place the specific resistance associated with the failed subsystem between the diagnostic bus 215 and system test ground point 217.

Figure 14:
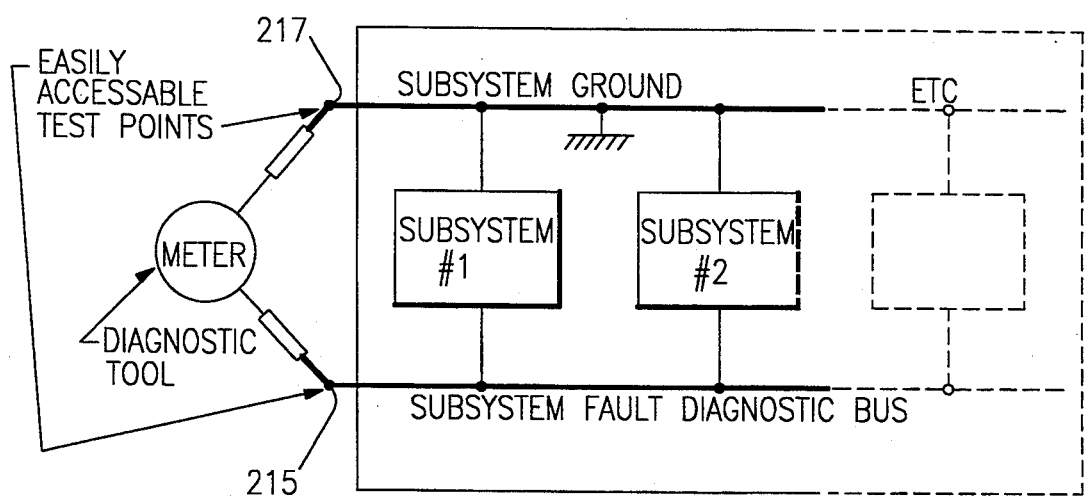
FIG. 14 is a schematic of a plurality of subsystem diagnostic circuits.

As shown in FIG. 14, a voltmeter (not shown) would then be put into contact with diagnostic bus 215 and system test ground point 217 which would provide a resistance reading. Because each subsystem has a different resistance based on different electrical parameter generators 213, the voltmeter reading will vary according to which subsystem failed thereby isolating the subsystem which will require maintenance. In a preferred embodiment, combinations of failed subsystems may be diagnosed if the number of resistors, their values and accuracy are appropriately chosen.

This diagnostic capability of the preferred embodiment is advantageous because it is not necessary that the system 10 microprocessor be working. Furthermore, testing the easily accessible diagnostic bus 215 and system test ground point 217 allows the service technician to quickly isolate a failure within data gathering system 10. Furthermore, the diagnosis requires only a simple electrical measurement such as resistance, voltage or current which in turn requires a simple voltmeter or the like.

Thus, a data gathering system has been shown and described. Though certain examples and advantages have been disclosed, further advantages and modifications may become obvious to those skilled in the art from the disclosures herein. The current invention therefore is not to be limited except in the spirit of the claims that follow.

What is claimed is:

1. A combined weighing and data reading apparatus, comprising:
    a base enclosure;
    a scanner which emits a scanning beam pattern for scanning an item, the scanner being housed within the base enclosure;
    a scale housed within the base enclosure;
    a first load cell beam and a second load cell beam mounted to the base enclosure;
    a platter mounted to the scale, the platter deflecting downward when an item is placed thereon thereby transmitting a downward force to the first load cell beam and second load cell beam to produce information for calculating a weight measurement;
    a first panel pivotally attached to a first side of the base enclosure; and
    a second panel pivotally attached to a second side of the base enclosure.

2. The apparatus of claim 1, wherein:
    the first panel may be opened and closed such that when closed the first panel covers a first portion of the base enclosure, and when opened the first panel serves as a first handle to manipulate the apparatus; and
    the second panel may be opened and closed such that when closed the second panel covers a second portion of the base enclosure, and when opened the second panel serves as a second handle to manipulate the apparatus.

3. A data gathering system, comprising:
    a base;
    a scanner which emits a scanning beam pattern for scanning an item, the scanner being mounted to the base;
    a scanner printed circuit board to receive information from the scanned item;
    a scale to weigh the item, the scale being mounted to the base; and
    a diagnostic unit attached to the data gathering system including a plurality of indicators to indicate a source of a failure within the scanner or scale, and including
        a diagnostic bus;
        a data gathering system test ground point
        a diagnostic circuit coupled to the scanner or scale or both, including,
            a fault detection circuit,
            an electronic switch, controlled by the fault detection circuit and coupled to the data gathering system test ground point, and
            an electrical parameter generator attached to the scanner electronic switch and coupled to the diagnostic bus.

4. The data gathering system of claim 3:
    wherein the scanner includes a scanner housing which substantially defines the perimeter of the scanner, the scanner housing including an indentation in one of its sides; and
    wherein the scanner printed circuit board is mounted to a bottom surface of the scanner housing, the indicators being located on the scanner circuit board and are positioned within the indentation.

5. The data gathering system of claim 3 wherein the diagnostic bus and the data gathering system test ground point are mounted on the exterior of the base.

6. A data gathering system, comprising:
    a base enclosure constructed of rigid material, the base enclosure including,
        a central area having a first, second, third and fourth contiguous sides and a central area bottom wherein the sides are contiguous with the central area bottom;
        a first and second inner side channels attached to the first and third sides of the central area;
        a first and second inner end channels connected to the second and fourth sides of the central area;
        a first and second intermediate side channels respectively connected to the first and second inner side channels by first and second intermediate sidewalls, the first and second intermediate side channels respectively including first and second intermediate side floors;
        a first and second outer side channels respectively connected to the first and second intermediate side channels by first and second outer sidewalls, the first and second outer side channels respectively including first and second perimeter sidewalls positioned opposite the first and second outer side walls, the first and second outer side channels respectively including first and second outer side channel floors;

a first and second outer end channels respectively connected to the first and second inner end channels by first and second intermediate endwalls, the first and second outer end channels respectively including first and second perimeter endwalls positioned opposite the first and second intermediate endwalls, the first and second outer end channels respectively including first and second outer end channel floors;

a scanner which emits a scanning beam pattern to scan an item, the scanner being housed within the central area;

a scale housed within the base enclosure;

a first and second load cell beams respectively mounted within the first and second inner side channels;

a platter mounted to the scale.

7. The data gathering system of claim 6 wherein the platter further comprises:

a first, second, third and fourth contiguous platter sides;

a first and second side flanges mounted to the first and third platter sides; and a first and second end flanges mounted to the second and fourth platter sides;

wherein the platter is mounted to the scale with a first gap between the first platter side flange and the first outer sidewall, a second gap between the first platter end flange and the first perimeter endwall, a third gap between the second platter side flange and the second outer sidewall, and a fourth gap between the second platter end flange and the second perimeter endwall.

8. The data gathering system of claim 6 wherein the base enclosure defines the boundaries of the data gathering system, the base enclosure having a maximum height of 8.5 inches (21.6 cm) or less.

9. The data gathering system of claim 6 wherein the scanner, scale, and first and second load cell beams are positioned within the base enclosure and on a common horizontal plane.

10. The data gathering system of claim 6, further comprising:

an indicator displaying whether a bar code read was successful, the indicator being housed in the first outer side channel; and a connector which attaches the indicator to the scanner.

11. The data gathering system of claim 6, further comprising:

first and second mounts attached at either end of the first outer side channel; and third and fourth mounts attached at either end of the second outer side channel;

wherein the first, second, third and fourth mounts are positioned within the vertical dimension of the base enclosure.

12. The data gathering system of claim 6, further comprising:

a first panel pivotally attached to the first perimeter sidewall; and a second panel pivotally attached to the second perimeter sidewall.

13. The data gathering system of claim 12 wherein:

the first panel may be opened and closed such that when closed the first panel covers the first outer side channel, and when opened the first panel serves as a first handle; and the second panel may be opened and closed such that when closed the second panel covers the second outer side channel, and when opened the second panel serves as a second handle.

14. The data gathering system of claim 6, wherein the base enclosure further comprises:

a first pad mounted on a floor of the first inner side channel, the first load cell beam being mounted to the first pad;

a second pad mounted on a floor of the second inner side channel, the second load cell beam being mounted to the second pad.

15. The data gathering system of claim 14 wherein the first pad and second pad respectively vertically position the first load cell beam and second load cell beam in a horizontally level plane.

16. The data gathering system of claim 6, further comprising:

a load cell printed circuit board attached to the base enclosure and connected to the first and second load cell beams by first and second load cell connectors respectively; and wherein the scanner further comprises:

a scanner housing, and a scanner printed circuit board mounted to a bottom surface of the scanner housing, the scanner printed circuit board including a scanner board connector.

17. The data gathering system of claim 16, further comprising:

a movable floating connector mounted in a hole located off-center in the central area bottom, the floating connector mounted so that it engages the scanner board connector when the scanner is housed in the central area;

a main printed circuit board attached to the base enclosure, the main printed circuit board being coupled to the floating connector and coupled to the load cell printed circuit board and being capable of performing functions in support of the scanner and scale.

18. The data gathering system of claim 6 wherein the first and second outer end channel floors comprise a plurality of coin deflectors successively positioned between a plurality of spaces, the coin deflectors, comprising:

a first sloped flange attached to a second sloped flange thereby forming a peak.

19. The data gathering system of claim 6 wherein the first and second intermediate side channel floors comprise, a first sloped portion attached to a second sloped portion thereby forming a peak;

a first space located at one end of the first and second intermediate channel floors; and a second space located at a second end of the first and second intermediate channel floors.

20. The data gathering system of claim 6 wherein the first and second outer side channel floors comprise:

a first sloped portion attached to a second sloped portion thereby forming a peak;

a first space located in proximity to one end of the first and second outer side channel floors; and a second space located in proximity to a second end of the first and second outer side channel floors.

21. A data gathering system, comprising:

a base enclosure;

a scanner which emits a scanning beam pattern to scan an item, the scanner being coupled to the base enclosure;

a scale to weigh the item, the scale being coupled to the base enclosure;

a first handle attached to the base enclosure, and movable between at least two positions including a position where the first handle covers a first portion of the base enclosure and another position where the first handle facilitates manipulation of the data gathering system; and a second handle attached to the base enclosure, and movable between at least two positions including a position where the second handle covers a second portion of the base enclosure and another position where the second handle facilitates manipulation of the data gathering system.

22. The data gathering system of claim 21 wherein the first and second handles are pivotally attached to the base enclosure.

23. The data gathering system of claim 21 wherein the first and second handles are movable away from the base enclosure thereby providing access to an interior portion of the data gathering system.

24. The data gathering system of claim 21 wherein the first and second handles are adapted to be physically grasped to facilitate manipulation of the base enclosure.

25. The data gathering system of claim 21 wherein the base enclosure defines the boundaries of the data gathering system, and the scale module is housed within the base enclosure, and the scanner module is housed within the base enclosure and positioned within the scale module.

26. The data gathering system of claim 21 wherein the base enclosure defines the boundaries of the data gathering system, and the scanner and scale modules are housed within the base enclosure and positioned in a common horizontal plane.

27. A data gathering system, comprising:

a base enclosure including at least one channel;

a scanner which emits a scanning beam pattern to scan an item, the scanner being coupled to the base enclosure;

a scale to weigh the item, the scale being coupled to the base enclosure; and a platter which is mounted on the scale and which includes at least one platter flange connected to a side of the platter and extending downward therefrom, the at least one platter flange extending into the at least one channel when the platter is mounted on the scale module.

28. The data gathering system of claim 27, wherein the at least one channel of the base enclosure is remote from the scanner and scale.

29. The data gathering system of claim 27 wherein the at least one channel is defined by at least one channel wall, and the at least one platter flange overlaps the at least one channel wall when extending into the at least one channel.

30. The data gathering system of claim 27 wherein the at least one channel includes at least one channel floor that has:

a first sloped portion attached to a second sloped portion thereby forming a peak;

a first opening located at one end of the channel floor; and a second opening located at a second end of the channel floor.

31. The data gathering system of claim 27 wherein the at least one channel and the at least one platter flange extend around a periphery of the scanner and scale thereby preventing debris from entering the scanner or scale.

* * * * *